United States Patent
Chu

(10) Patent No.: US 8,037,232 B2
(45) Date of Patent: Oct. 11, 2011

(54) DATA PROTECTION METHOD FOR POWER FAILURE AND CONTROLLER USING THE SAME

(75) Inventor: Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 439 days.

(21) Appl. No.: 12/015,373

(22) Filed: Jan. 16, 2008

(65) Prior Publication Data

US 2009/0089484 A1    Apr. 2, 2009

(30) Foreign Application Priority Data

Sep. 28, 2007  (TW) ................. 96136249 A

(51) Int. Cl.
 *G06F 12/16* (2006.01)
(52) U.S. Cl. ................. 711/103; 711/202; 711/E12.078
(58) Field of Classification Search .................. 711/103, 711/202
See application file for complete search history.

(56) References Cited

U.S. PATENT DOCUMENTS

| 6,678,787 B2 * | 1/2004 | Petruschka et al. ........... 711/112 |
| 2007/0220197 A1 * | 9/2007 | Lasser .......................... 711/103 |

FOREIGN PATENT DOCUMENTS

| CN | 1290014 | 4/2001 |
| WO | WO 2007/072317 | 6/2007 |

* cited by examiner

*Primary Examiner* — Kenneth M Lo
(74) *Attorney, Agent, or Firm* — J.C. Patents

(57) ABSTRACT

A data protection method suitable for a plurality of physical blocks mapped to a logical block in a non-volatile memory is provided. The data protection method includes recording data update information in each of the physical blocks for identifying an update relationship of the physical blocks and re-establishing the update relationship of the physical blocks according to the data update information. The data update information is composed of a plurality of words having a circular relationship, and the number of these words is greater than the number of the physical blocks. The data update information is sequentially recorded in each of the physical blocks according to the update relationship and the circular relationship.

19 Claims, 9 Drawing Sheets

DATA PROTECTION METHOD FOR POWER FAILURE AND CONTROLLER USING THE SAME

CROSS-REFERENCE TO RELATED APPLICATION

This application claims the priority benefit of Taiwan application serial no. 96136249, filed on Sep. 28, 2007. The entirety of the above-mentioned patent application is hereby incorporated by reference herein and made a part of this specification.

BACKGROUND OF THE INVENTION

1. Field of the Invention

The present invention generally relates to a data protection method, in particular, to a data protection method for power failure and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides being applied in foregoing portable products, flash memory is also broadly applied to external products such as flash cards and flash drives. Thereby, flash memory has become one of the most focused electronic products in recent years.

A flash memory is usually managed in unit of blocks. The problem of incorrect or instable data may be caused if one logical block is mapped to a plurality of physical blocks in a flash memory and a power failure occurs while writing data into the flash memory. In other words, the system cannot identify physical blocks containing original data and physical blocks containing new data after the power supply is resumed.

Conventionally, to resolve foregoing problem, related information is recorded in a byte of a redundant area in each page of a physical block. Taking a flash memory in which three physical blocks are mapped to one logical block as example, different indicators are respectively written into a selected byte based on the fact that each bit in a flash memory can be changed from 1 to 0. For example, FF is written for indicating that the data is recorded during a first period, 0F is written to replace FF for indicating that the data is recorded during a second period, and 00 is written to replace 0F for indicating that the data is recorded during a third period. In other words, the data recorded is the newest data if the indicator is FF, the data recorded is older data if the indicator is 0F, and the data recorded is the oldest data if the indicator is 00.

However, the conventional technique described above has following problem. If the memory used is a multi-level cell (MLC) NAND flash memory, foregoing method of writing indicators into the memory in multiple times cannot be adopted because this kind of flash memory can be written only once. In other words, the indicator cannot be changed once it is written into a MLC NAND flash memory.

Thereby, it is needed to provide a data protection method for identifying the update relationship of blocks in a memory after a power failure.

SUMMARY OF THE INVENTION

Accordingly, the present invention is directed to a data protection method for a non-volatile memory, wherein new and old data can be effectively identified after a power failure.

The present invention is directed to a controller for executing a data protection procedure for a non-volatile memory, wherein new and old data can be effectively identified after a power failure.

The present invention provides a data protection method suitable for a plurality of physical blocks mapped to a logical block in a non-volatile memory. The data protection method includes recording data update information in each of the physical blocks for identifying an update relationship of the physical blocks and re-establishing the update relationship of the physical blocks according to the data update information. The data update information is composed of a plurality of words having a circular relationship, and the number of these words is greater than the number of the physical blocks. The data update information is sequentially recorded in each of the physical blocks according to the update relationship and the circular relationship.

According to an embodiment of the present invention, the words are a plurality of numbers or a plurality of characters.

According to an embodiment of the present invention, the step of re-establishing the update relationship includes identifying a physical block containing the data update information of a word next to an unused word as the physical block having the oldest data according to the circular relationship and sequentially identifying the update relationship of the other physical blocks according to the circular relationship.

According to an embodiment of the present invention, the step of re-establishing the update relationship includes identifying a physical block containing the data update information of a word next to an unused word as the physical block having the newest data according to the circular relationship and sequentially identifying the update relationship of the other physical blocks according to the circular relationship.

According to an embodiment of the present invention, the step of recording the data update information in each of the physical blocks is to record the data update information in a redundant area of the physical block.

According to an embodiment of the present invention, the non-volatile memory is a flash memory wherein each page can be programmed only once.

The present invention provides a controller suitable for a storage device, wherein in a non-volatile memory of the storage device, one logical block is mapped to a plurality of physical blocks. The controller includes a non-volatile memory interface, a buffer memory, a microprocessor unit, and a memory management module. The non-volatile memory interface is used for accessing the non-volatile memory. The buffer memory is used for storing data temporarily. The microprocessor unit controls the operation of the controller. The memory management module manages the non-volatile memory. The memory management module records data update information in each of the physical blocks for identifying an update relationship of the physical blocks and re-establishes the update relationship of the physical blocks according to the data update information. The data update information is composed of a plurality of words having a circular relationship, and the number of these words is greater than the number of the physical blocks. The data update information is sequentially recorded in each of the physical blocks according to the update relationship and the circular relationship.

According to an embodiment of the present invention, the words are a plurality of numbers or a plurality of characters.

According to an embodiment of the present invention, in re-establishing the update relationship the memory management module identifies a physical block containing the data update information of a word next to an unused word as the physical block having the oldest data according to the circular relationship and sequentially identifies the update relationship of the other physical blocks according to the circular relationship.

According to an embodiment of the present invention, in re-establishing the update relationship the memory management module identifies a physical block containing the data update information of a word next to an unused word as the physical block having the newest data according to the circular relationship and sequentially identifies the update relationship of the other physical blocks according to the circular relationship.

According to an embodiment of the present invention, in recording the data update information in each of the physical blocks the memory management module records the data update information in a redundant area of the physical block.

According to an embodiment of the present invention, the non-volatile memory is a flash memory wherein each page can be programmed only once.

According to an embodiment of the present invention, the flash memory is a SLC NAND flash memory or a MLC NAND flash memory.

According to an embodiment of the present invention, the storage device is a flash memory storage medium, a USB flash drive, a flash memory card, or a solid state drive (SSD).

The present invention provides a data protection method suitable for a plurality of physical blocks mapped to a logical block in a non-volatile memory. The data protection method includes recording data update information in each of the physical blocks for identifying and update relationship of the physical blocks and re-establishing the update relationship of the physical blocks according to the data update information. The data update information is recorded into a physical block while writing data into the physical block.

According to an embodiment of the present invention, the data update information can be written into the physical block only once.

According to an embodiment of the present invention, the data update information in the physical block is composed of a plurality of circular words.

According to an embodiment of the present invention, the number of the circular words is between 3 and 5.

The present invention provides a controller suitable for a storage device, wherein in a non-volatile memory of the storage device, one logical block is mapped to a plurality of physical blocks. The controller includes a non-volatile memory interface, a buffer memory, a microprocessor unit, and a memory management module. The non-volatile memory interface is used for accessing the non-volatile memory. The buffer memory is used for storing data temporarily. The microprocessor unit controls the operation of the controller. The memory management module manages the non-volatile memory. The memory management module records data update information in each of the physical blocks for identifying an update relationship of the physical blocks and re-establishes the update relationship of the physical blocks according to the data update information. The data update information is recorded in a physical block while writing data into the physical block, and the data update information can be written into the physical block only once.

According to an embodiment of the present invention, the storage device is a flash memory storage medium, a USB flash drive, a flash memory card, or a SSD.

The present invention provides a data protection method, wherein data update information is effectively recorded in a plurality of physical blocks mapped to a logical block, and an update relationship of these physical blocks is re-established according to the data update information after a power failure so that data loss caused by the power failure can be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
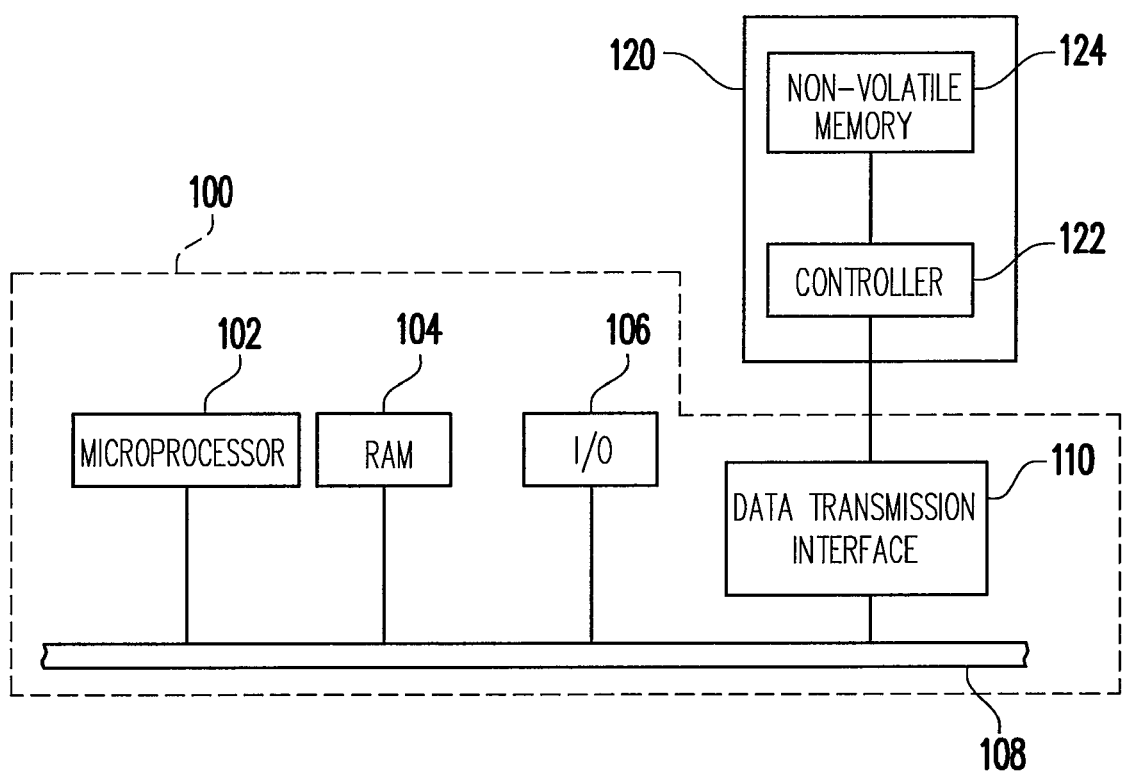
FIG. 1A illustrates a host having a non-volatile memory storage device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Generally speaking, a non-volatile memory storage system includes a non-volatile memory and a controller (a control IC). A non-volatile memory storage system is usually used together with a host system so that the host system can write data into the non-volatile memory storage system or read data from the same. In addition, a non-volatile memory storage system may include an embedded non-volatile memory and a software which can be executed by a host system to substantially serve as a controller of the embedded non-volatile memory.

FIG. 1A illustrates a host having a non-volatile memory storage device according to an embodiment of the present invention.

Referring to FIG. 1A, the host 100 includes a microprocessor 102, a random access memory (RAM) 104, an input/output (I/O) device 106, a system bus 108, and a data transmission interface 110. It has to be noted that the host 100 may further include other components, such as a display device or a network device.

The host 100 may be a computer, a digital camera, a video camera, a communication device, an audio player, or a video player. Generally speaking, the host 100 can be substantially any system which can store data.

In the present embodiment, the non-volatile memory storage device 120 is electrically connected to the host 100 through the data transmission interface 110. Data can be written into or read from the non-volatile memory storage device 120 through the microprocessor 102, the RAM 104, and the I/O device 106. The non-volatile memory storage device 120 may be a flash drive, a memory card, or a solid state drive (SSD).

Figure 1B:
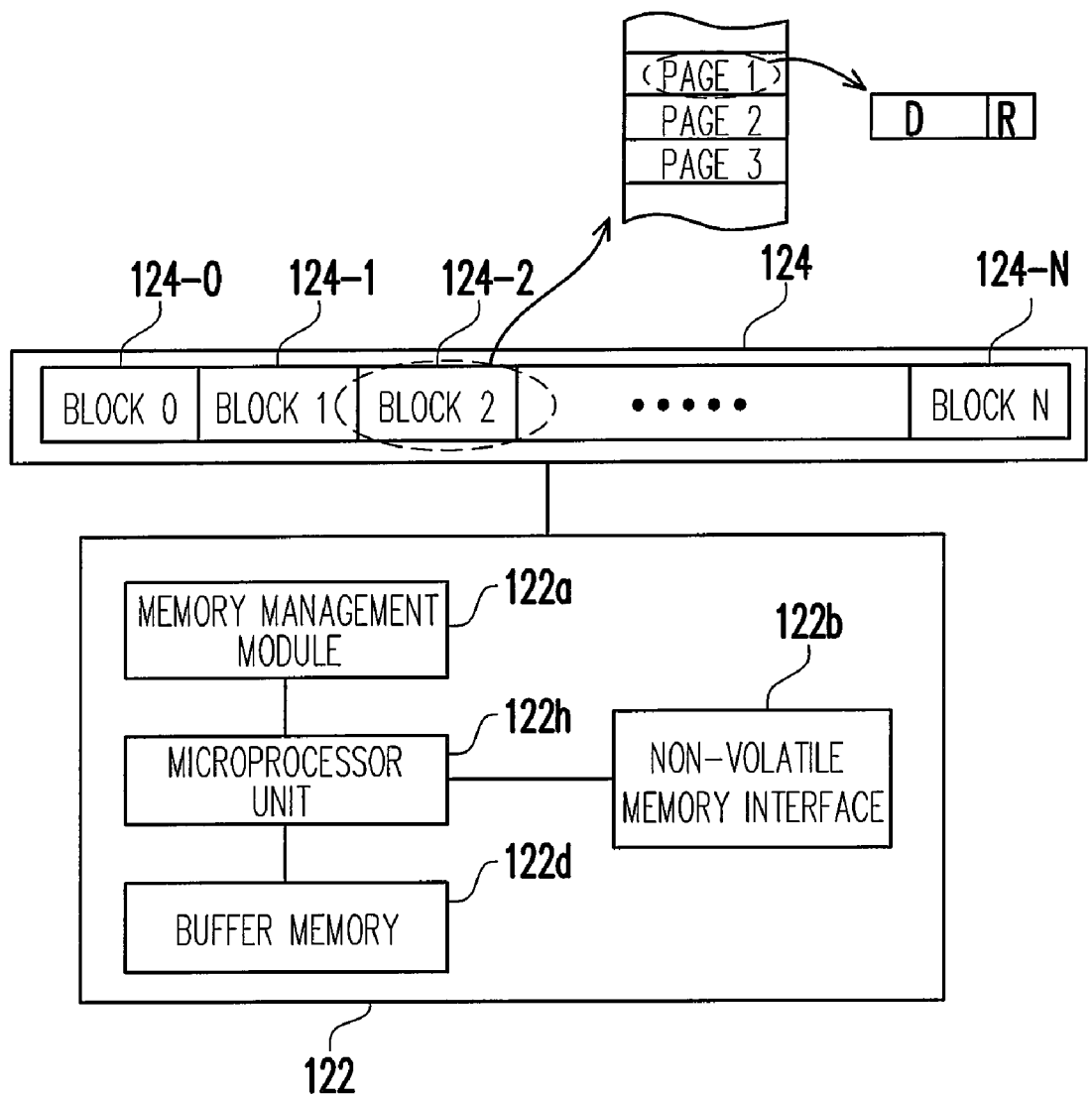
FIG. 1B is a detailed block diagram of the non-volatile memory storage device in FIG. 1A.

FIG. 1B is a detailed block diagram of the non-volatile memory storage device as illustrated in FIG. 1A.

Referring to FIG. 1B, the non-volatile memory storage device 120 includes a controller 122 and a non-volatile memory 124.

The controller 122 controls the operation of the non-volatile memory storage device 120, such as data storing, data reading, and data erasing etc. The controller 122 includes a memory management module 122a, a non-volatile memory interface 122b, a buffer memory 122d, and a microprocessor unit 122h.

Figure 5:
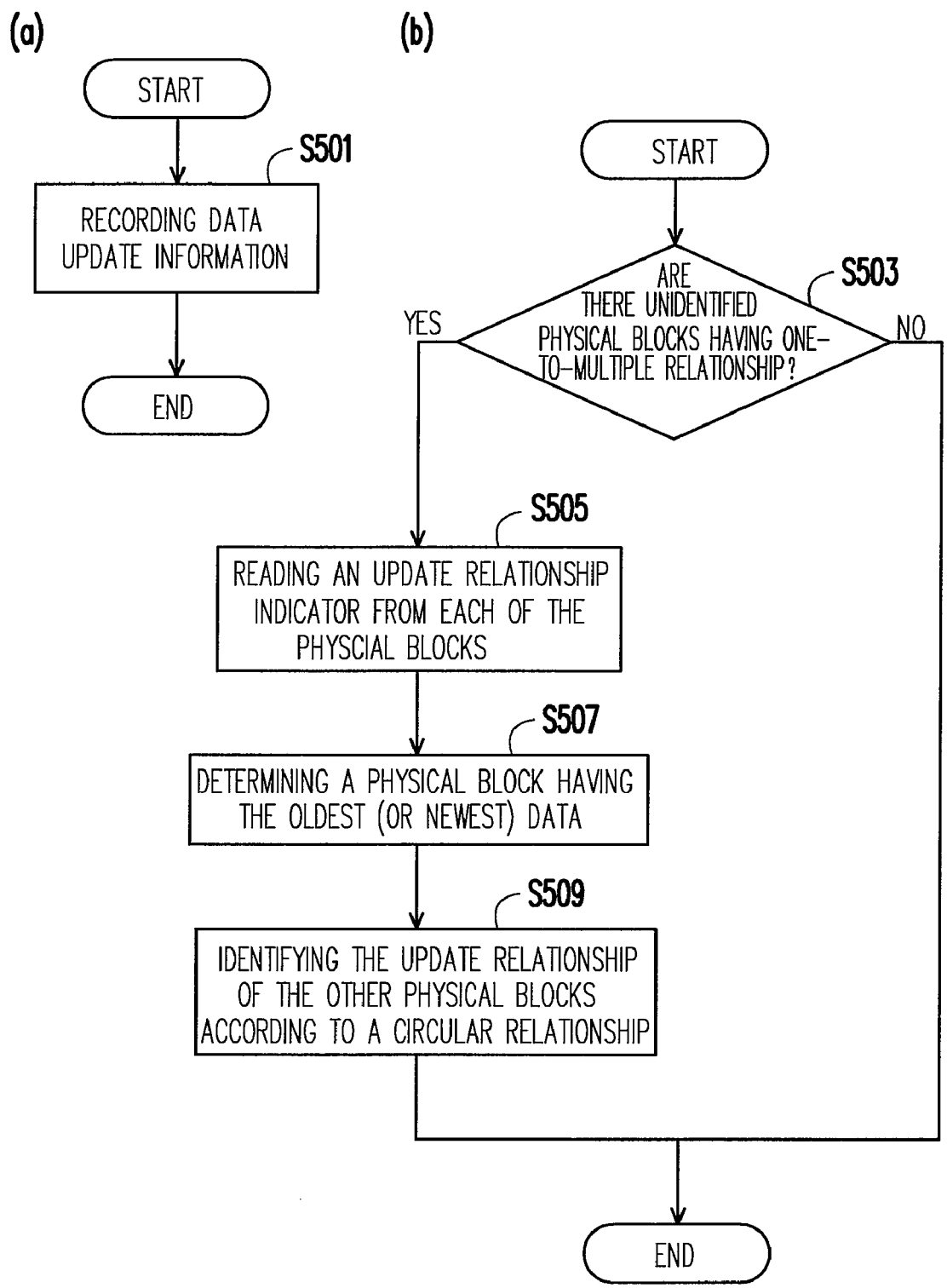
FIG. 5 is a flowchart of a data protection method according to a first embodiment of the present invention.
Figure 6:
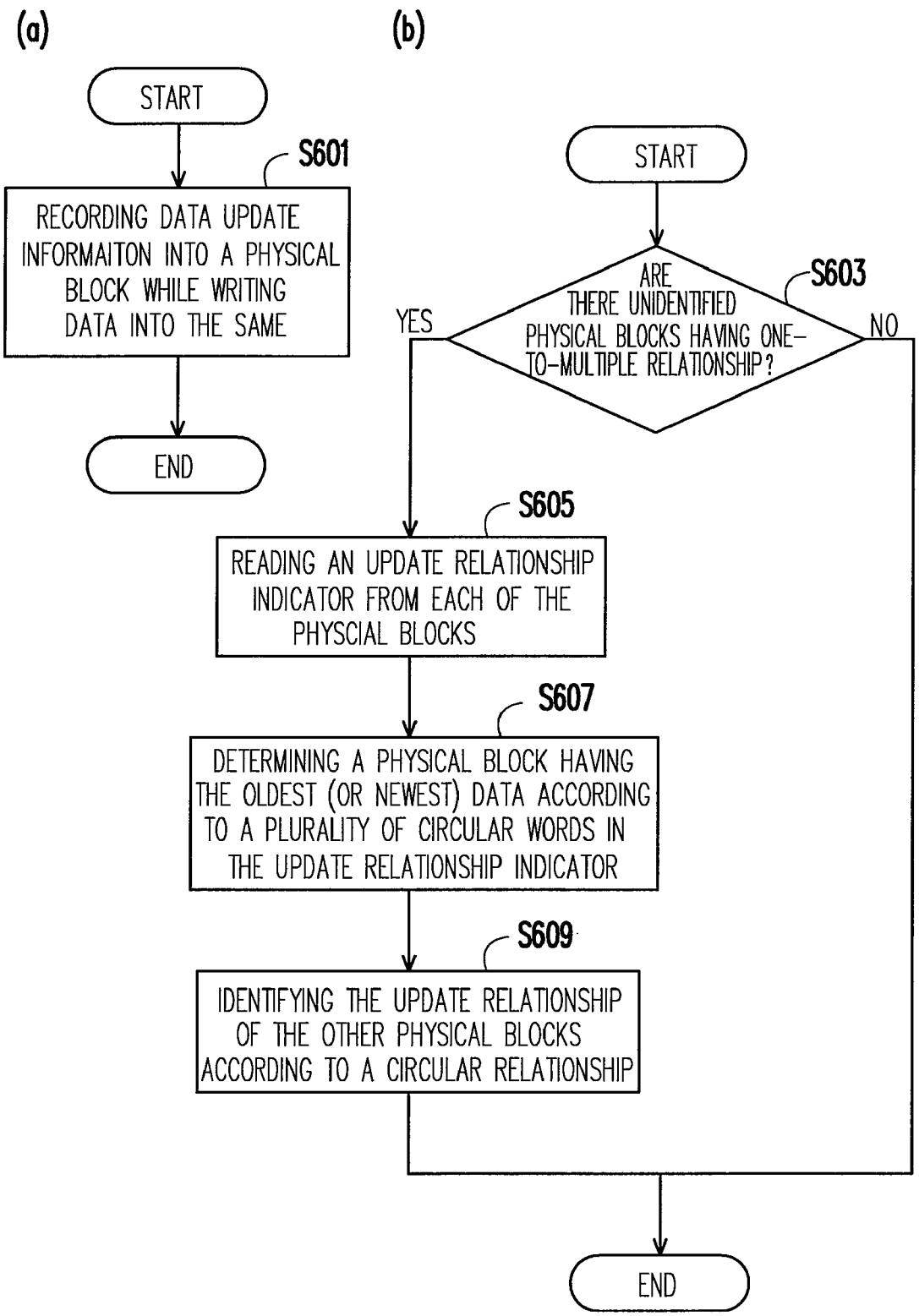
FIG. 6 is a flowchart of a data protection method according to a second embodiment of the present invention.
Figure 7:
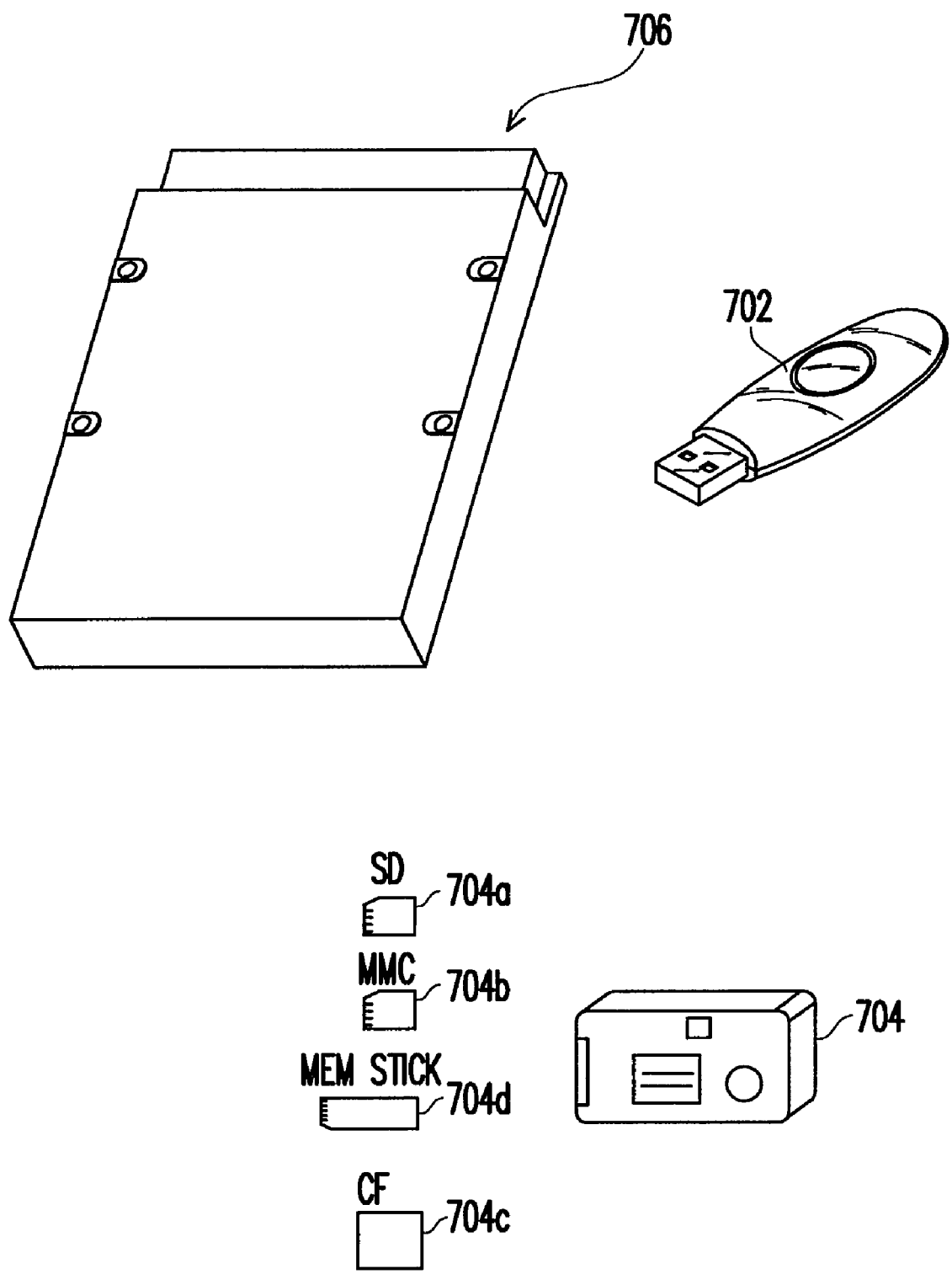
FIG. 7 is a diagram of various devices to which a data protection method according to an embodiment of the present invention can be applied.

The memory management module 122a is electrically connected to the microprocessor unit 122h and used for managing the non-volatile memory 124, for example, for executing a wear leveling method, managing bad blocks, and maintaining a mapping table etc. In particularly, the memory management module 122a may execute a data protection procedure according to the present embodiment (as shown in FIG. 5 or 6).

The non-volatile memory interface 122b is electrically connected to the microprocessor unit 122h and used for accessing the non-volatile memory 124, namely, data to be written into the non-volatile memory 124 by the host 100 is converted by the non-volatile memory interface 122b into a format which is acceptable to the non-volatile memory 124.

The buffer memory 122d is electrically connected to the microprocessor unit 122h and temporarily stores system data (for example, a mapping table) or data to be read or written by the host. In the present embodiment, the buffer memory 122d is a static random access memory (SRAM). However, the present invention is not limited thereto, and the buffer memory 122d may also be a dynamic random access memory (DRAM), a magnetoresistive random access memory (MRAM), a phase change random access memory (PCRAM), or other suitable memories.

The microprocessor unit 122h controls the operation of the controller 122.

Figure 1C:
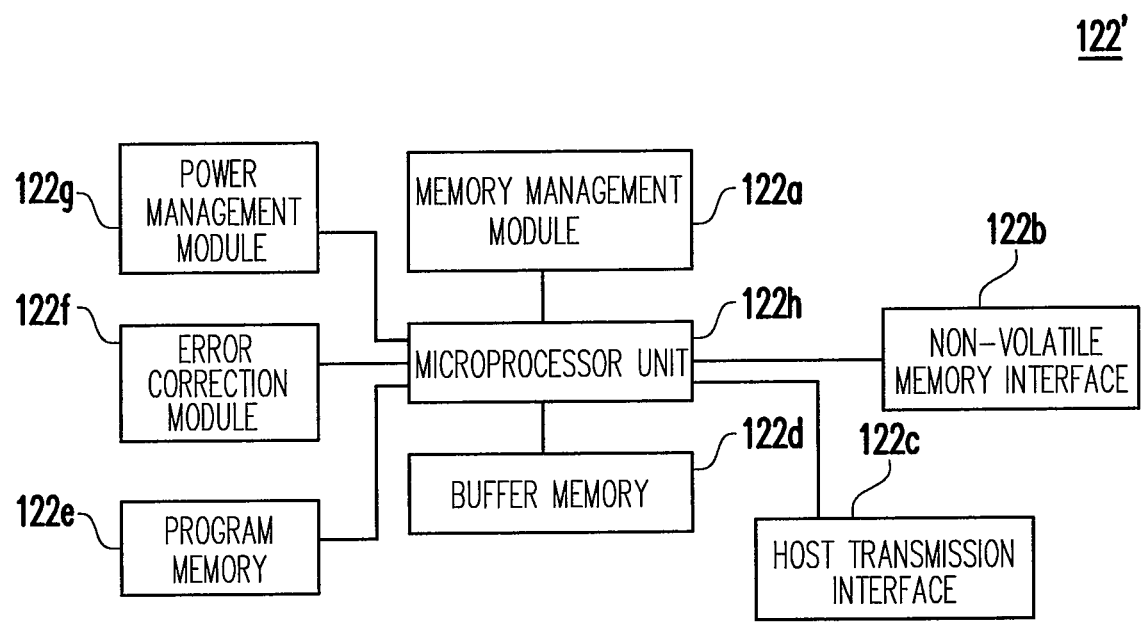
FIG. 1C is a block diagram of a controller according to another embodiment of the present invention.

FIG. 1C is a block diagram of a controller according to another embodiment of the present invention. Referring to FIG. 1C, the controller 122' further includes a host transmission interface 122c, a program memory 122e, an error correction module 122f, and a power management module 122g.

The host transmission interface 122c is electrically connected to the microprocessor unit 122h and used for communicating with the host 100, and which may be a USB interface, an IEEE 1394 interface, a SATA interface, a PCI Express interface, a MS interface, a MMC interface, a SD card interface, a CF card interface, or an IDE interface.

The program memory 122e is electrically connected to the microprocessor unit 122h and stores a program executed by the controller for controlling the non-volatile memory storage device 120.

The error correction module 122f is electrically connected to the microprocessor unit 122h and calculates an error correcting code (ECC code) for checking and correcting the data to be read or written by the host.

The power management module 122g is electrically connected to the microprocessor unit 122h and manages the power supply of the non-volatile memory storage device 120.

The non-volatile memory 124 stores data. In the present embodiment, the non-volatile memory 124 is a flash memory. To be specific, the non-volatile memory 124 is a multi-level cell (MLC) NAND flash memory. However, the present invention is not limited thereto, and the non-volatile memory 124 may also be a single-level cell (SLC) NAND flash memory.

The non-volatile memory 124 is substantially divided into a plurality of physical blocks 124-0~124-N, and for the convenience of description, these physical blocks will be referred as blocks. Generally speaking, data in a flash memory is erased in unit of blocks. In other words, each block contains the smallest number of memory cells which are erased together. Each block is usually divided into a plurality of pages. A page is the smallest programming unit. However, it has to be noted that the smallest programming unit may also be a sector in some other design of flash memory, namely, a page is further divided into a plurality of sectors and each sector is the smallest programming unit. In other words, a page is the smallest unit for writing and reading data. A page usually includes a user data area D and a redundant area R. The user data area is used for storing data of a user, and the redundant area is used for storing system data (for example, foregoing ECC code).

The user data area D usually has 512 bytes and the redundant area R usually has 16 bytes in order to correspond to the size of a sector in a disk driver. Namely, a page is a sector. However, a page may also be composed of more than one sector. For example, a page may include four sectors.

Generally speaking, a block may contain any number of pages, for example, 64 pages, 128 pages, and 256 pages etc. The blocks 124-0~124-N may also be grouped into a plurality of zones. By managing operations of a memory based on zones, parallelism of the operations can be increased and the management can be simplified.

Below the operation of a non-volatile memory will be described according to the present invention with reference to accompanying drawings. It has to be understood that in following descriptions, terms like "select", "move", and "exchange" are only used for referring to the logical operations performed to blocks in the flash memory. In other words, the physical positions of blocks in the flash memory are not changed, and these operations are only performed to these blocks logically.

Figure 2A:
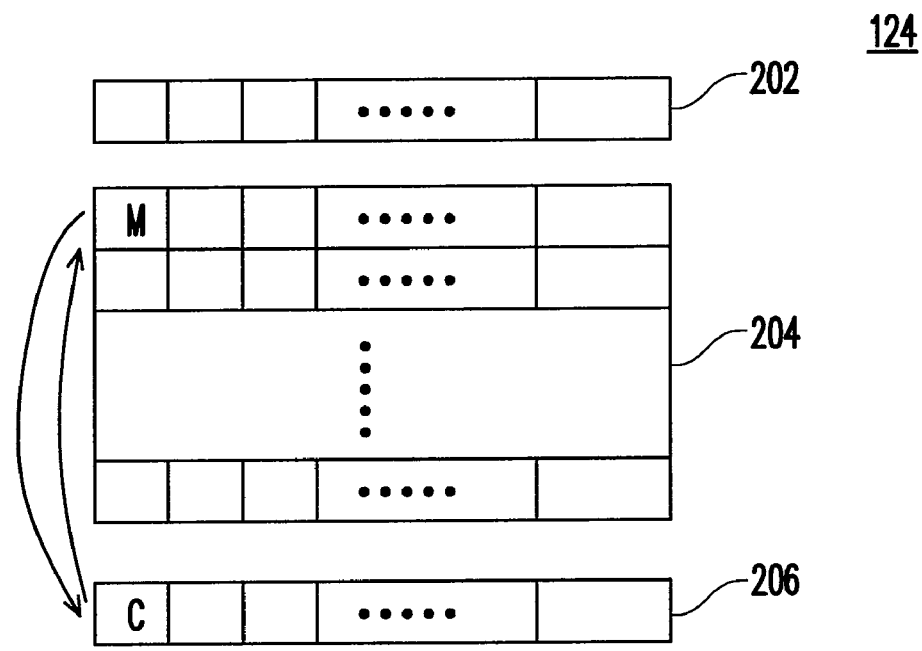
FIGS. 2A and 2B are detailed block diagrams of a non-volatile memory and the operation thereof according to an embodiment of the present invention.
Figure 2B:
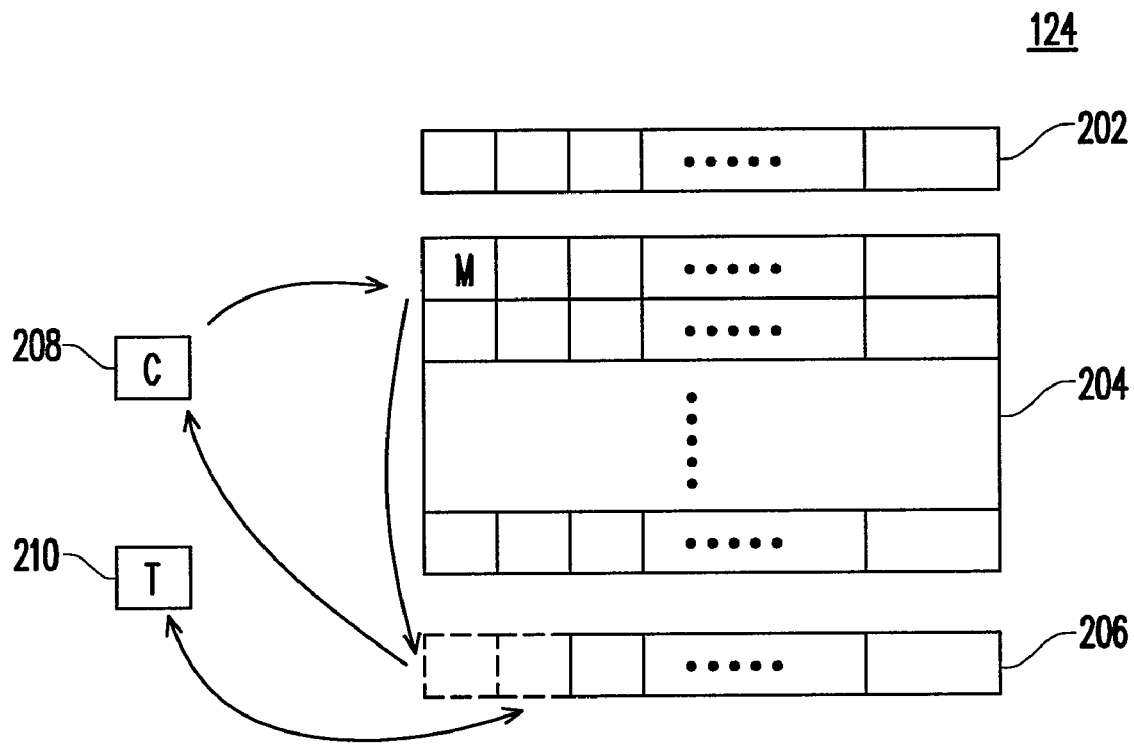

FIGS. 2A and 2B are detailed block diagrams of a non-volatile memory 124 and the operation thereof according to an embodiment of the present invention.

Referring to FIG. 2A, in the present embodiment, the blocks 124-1~124-N in the non-volatile memory 124 are logically grouped into a system area 202, a data area 204, and a spare area 206 in order to program (i.e. write and erase) the non-volatile memory 124 effectively. Generally speaking, more than 90% of blocks in the non-volatile memory 124 belong to the data area 204.

Those blocks in the system area 202 are used for recording system data, such as the number of zones in the non-volatile memory 124, the number of blocks in each zone, the number of pages in each block, and a logical-physical mapping table etc.

Blocks in the data area 204 are used for storing user data. Generally speaking, these blocks are corresponding to the logical block addresses operated by the host 100.

Blocks in the spare area 206 are used for replacing blocks in the data area 204. Thus, the blocks in the spare area 206 are empty or available blocks, namely, no data is recorded in these blocks or data recorded in these blocks has been marked as invalid data. To be specific, an erase operation has to be performed before writing data into a position in which data has been recorded before. However, as described above, data is written into a flash memory in unit of pages while erased from the same in unit of blocks. Since an erase unit is larger than a write unit, those valid pages in a block have to be copied to another block before erasing data from this block. Accordingly, to write a new data into a block M in the data area 204 in which a data has been written, a block C is first selected from the spare area 206 and the valid data in block M is copied to block C and the new data is written into block C. After that, block M is erased and moved to the spare area 206, and at the same time, block C is moved to the data area 204. It has to be understood that moving block M to the spare area 206 and at the same time moving block C to the data area 204 is to logically connect block M to the spare area 206 and block C to the data area 204. It should be understood by those having ordinary knowledge in the art that the logical relationship between blocks in the data area 204 can be maintained through a logical-physical mapping table.

In the present embodiment, the blocks 124-1~124-N are logically grouped into a substitution area 208 and a temporary area 210 in order to use the non-volatile memory 124 more efficiently.

Referring to FIG. 2B, the substitution area 208 temporarily stores blocks used for substituting blocks in the data area 204. To be specific, in the present embodiment, when block C in the spare area 206 is selected for replacing block M in the data area 204, the new data is written into block C, but the valid data in block M will not be copied instantly into block C to erase block M. This is because the valid data in block M may become invalid in the next operation, so that moving the valid data in block M instantly to block C may become meaningless. In the present embodiment, block C containing the new data is connected to the substitution area temporarily, and the fact that multiple physical blocks are mapped to one logical block is recorded, namely, the combination of the content of block M and the content of block C is the content of the corresponding logical block. Accordingly, the blocks can be used more efficiently. Such mother-child relationship between blocks (e.g. block M and block C) can be determined according to the size of the buffer memory 122d in the controller 122, and in the present embodiment, five sets of blocks having such relationship are assumed.

The temporary area 210 has similar function as the substitution area 208. As described above, in the present embodiment, the non-volatile memory is a MLC NAND flash memory. The MLC NAND flash memory has multiple layers of memory cells, wherein one page contains four sectors, namely, one page has four sectors of 512 bytes, which is 2048 bytes in total. As described above, data is written into a flash memory in unit of pages. Thus, while writing data into the MLC NAND flash memory, four sectors have to be programmed each time, so that memory space is wasted when the data to be written is less than one page. In the present embodiment, the temporary area 210 is used for storing data of small quantity. To be specific, as described above, if the data to be written into block C in the substitution area 208 is less than one page, block T is selected from the spare area 206 and this data is written into block T. Then block T is connected to the temporary area 210. When subsequently the data to be written into the memory is enough for one page, the data is then written into block C, and block T is erased and moved from the temporary area 210 to the spare area 206.

As described above, block C and block T are used for updating data in block M so as to avoid erasing a block frequently. However, if the blocks M, C, and T all exist in the system during the operation of the non-volatile memory storage device 120 and a power failure occurs, the update relationship between the blocks M, C, and T will be lost. To be specific, the temporary relationship between the blocks M, C, and T is stored in the buffer memory 122d of the controller 122 during the operation of the non-volatile memory storage device 120. When a power failure happens to the non-volatile memory storage device 120, the data in the buffer memory 122d will be lost. Accordingly, after the power supply is resumed, even though the controller 122 can obtain the information that blocks M, C, and T are mapped to the same logical block from the re-established logical-physical mapping table, the controller 122 cannot identify the update relationship of the blocks M, C, and T.

Figure 3:
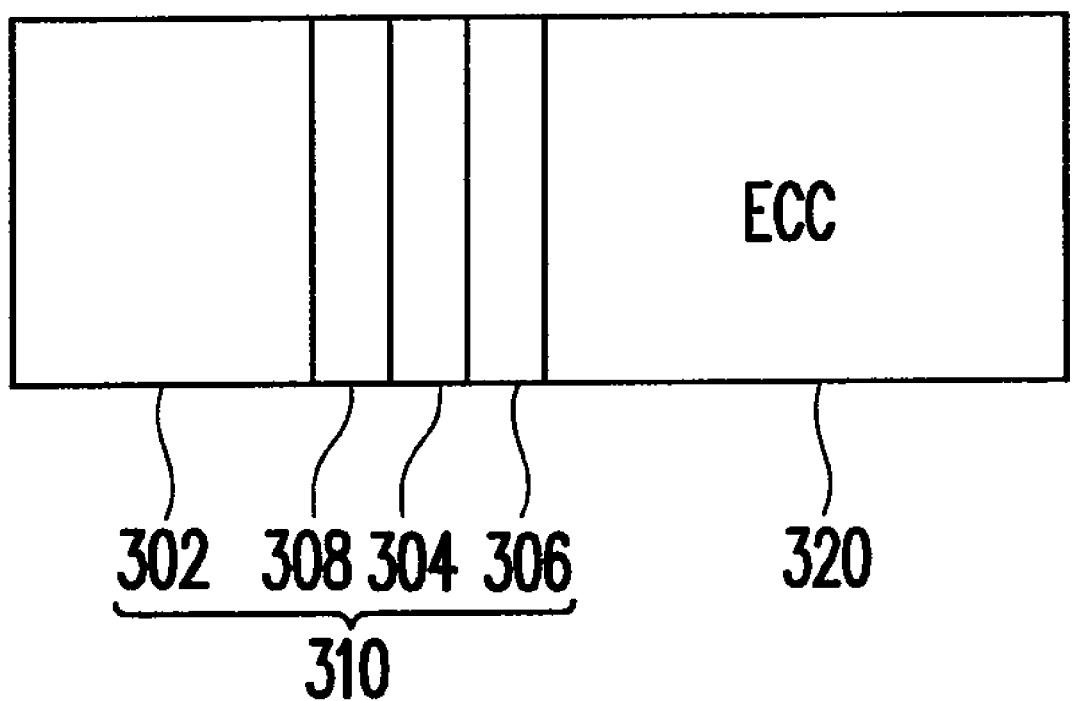
FIG. 3 is a detailed block diagram of a redundant area R in a page as illustrated in FIG. 1B according to an embodiment of the present invention.

To resolve foregoing problem, in the present invention, information about the update relationship of a block is recorded in a redundant area in a page of the block. FIG. 3 is a detailed block diagram of a redundant area R in a page as illustrated in FIG. 1B according to an embodiment of the present invention.

As described above, the redundant area R usually has 16 bytes, wherein 6 bytes 310 are used for storing system information and 10 bytes 320 are used for storing an error correcting code (ECC). The bytes 310 for storing system information contain an addressing indicator 302, an update relationship indicator 304, a block state indicator 306, and other indicator 308.

The addressing indicator 302 includes 3 bytes, wherein two bytes are used for indicating the zone of the block, and one byte is used for indicating the logical block mapped to the block.

The update relationship indicator 304 includes one byte, and this one byte is used for indicating the data update information of the block when the temporary relationship of the blocks M, C, and T is recorded in the system, wherein the data update information represents the update relationship (i.e. new and old) of the blocks.

According to the present invention, when the temporary relationship of the blocks M, C, and T is recorded in the system, the memory management module 122a records the data update information in the update relationship indicator 304. The data update information is composed of a plurality of words having a circular relationship, and the number of these words is greater than the number of the blocks having the temporary relationship. Namely, if the temporary relationship is composed of n blocks, the data update information is composed of at least (n+1) words. In addition, the data update information is sequentially recorded in each of the physical blocks according to the update relationship of the blocks and the circular relationship of the words.

Figure 4A:
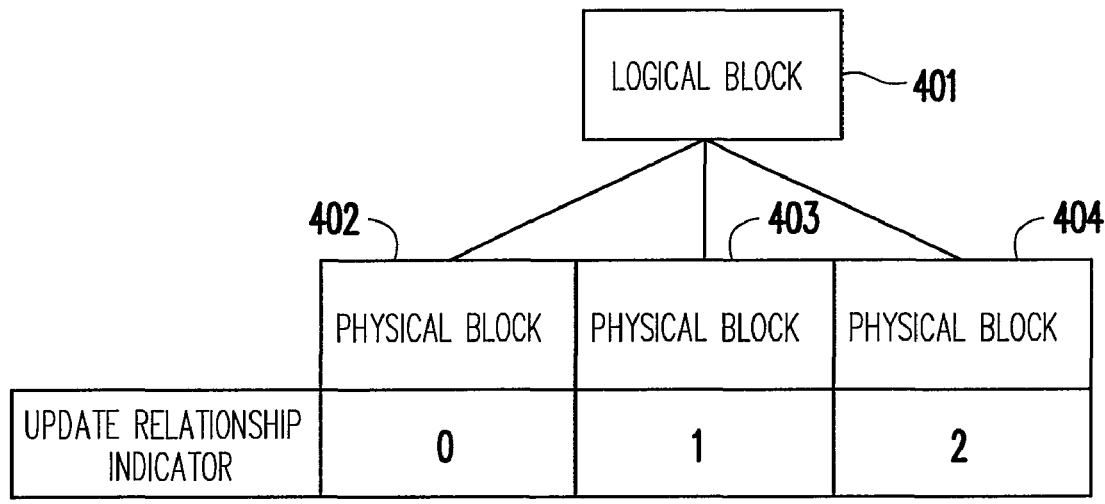
FIG. 4A is a diagram of a data update information when a logical block is mapped to three physical blocks according to an embodiment of the present invention.

FIG. 4A is a diagram of a data update information when a logical block is mapped to three physical blocks according to an embodiment of the present invention.

Referring to FIG. 4A, the logical block 401 is mapped to the physical blocks 402, 403, and 404, wherein the physical block 402 stores the oldest data, the physical block 403 stores older data, and the physical block 404 stores the newest data.

As shown in FIG. 4A, circular numbers 0~3 are used as the words of the data update information. Assuming that the update relationship indicator of the physical block 402 is 0, when a newer physical block 403 is used, the update relationship indicator of the physical block 403 is set to 1, and when an even newer physical block 404 is used, the update relationship indicator of the physical block 404 is set to 2. After a power failure of the non-volatile memory storage device 120, the controller 122 identifies that the unused word is 3 according to the data update information, and the word next to 3 among the circular words 0~3 is 0. Thus, the block having the oldest data is the physical block 402, and accordingly it is identified that the physical block 403 has older data and the physical block 404 has the newest data.

Figure 4B:
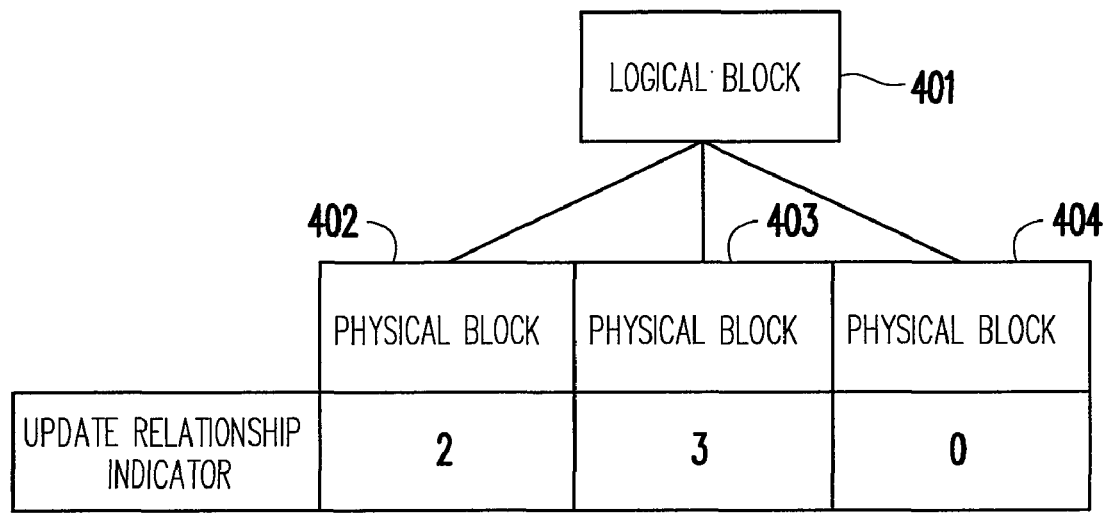
FIG. 4B is a diagram of another data update information according to FIG. 4A.

FIG. 4B is a diagram of another data update information according to FIG. 4A.

Referring to FIG. 4B, similarly, circular words 0~3 are used as the words of the data update information. Assuming that the update relationship indicator of the physical block 402 is 2, when a newer physical block is used, the update relationship indicator of the physical block 403 is set to 3, and when an even newer physical block 404 is used, the update relationship indicator of the physical block 404 is set to 0. After a power failure of the non-volatile memory storage device 120, the controller 122 identifies that the unused word is 1 according to the data update information, and the word next to 1 among the circular words 0~3 is 2. Thus, the physical block having the oldest data is the physical block 402, and accordingly it is identified that the physical block 403 has older data and the physical block 404 has the newest data.

Accordingly, in the present embodiment, one of the circular words is recorded in each of the physical blocks and the number of the circular words recorded in the physical blocks among the circular words is equal to the number of the physical blocks. Additionally, it should be noted that even though in the present embodiment, numbers are used as the data update information, the present invention is not limited thereto. In another embodiment, other symbols (for example, characters having circular relationship, such as A, B, C, D . . . ) may also be applied in the present invention.

In the present embodiment, the word next to an unused word in the data update information is used for indicating a block having the oldest data. However, in another embodiment of the present invention, the word next to an unused word in the data update information may be used for indicating a block having the newest data.

Referring to FIG. 3 again, the block state indicator 306 includes one byte, and this one byte is used for indicating whether the block is a normal or a defective block.

The other mark 308 includes one byte which is used for indicating other system information.

In the present embodiment, the present invention is described with a redundant area having 16 bytes and the distributions of the 16 bytes. However, the present invention is not limited thereto, and the redundant area may also have other number of bytes or different configuration.

FIG. 5 is a flowchart of a data protection method (procedure) according to a first embodiment of the present invention, wherein the data protection method is executed by the memory management module 122a of the controller 122 for re-establishing the update relationship of the blocks M, C, and T after a power failure.

Referring to FIG. 5, the data protection method is divided into two portions. In step S501 of portion (a) illustrated in FIG. 5, a data update information is recorded in each physical block having one-to-multiple relationship (i.e. one logical block is mapped to a plurality of physical blocks). The composition of the data update information has been described above therefore will not be described herein.

In step S503 of portion (b) illustrated in FIG. 5, whether there is a plurality of physical blocks having unidentified update relationship in a logical-physical mapping table is determined after a power failure. If it is determined that such physical blocks exist in the logical-physical mapping table in step S503, an update relationship indicator is read from a redundant area in a page of each of the physical blocks in step S505. After that, in step S507, a block having the oldest (or newest) data is determined according to the words of the data update information read from the update relationship indicator. The method for determining the block having the oldest (or newest) data has been described above with reference to FIGS. 4A and 4B therefore will not be described herein. Next, in step S509, the update relationship of the other physical blocks is identified according to the circular relationship of the data update information.

FIG. 6 is a flowchart of a data protection method (procedure) according to a second embodiment of the present invention. The hardware structure of the controller for executing the data protection method in the second embodiment is the same as that in the first embodiment therefore will not be described herein.

Referring to FIG. 6, the data protection method is also divided into two portions. In step S601 of portion (a) as illustrated in FIG. 6, a data update information is recorded in each physical block having one-to-multiple relationship (i.e. one logical block is mapped to a plurality of physical blocks) while writing data into the physical block. The composition of the data update information has been described above therefore will not be described herein.

In another embodiment of the present invention, the data update information can be written into the physical blocks only once. Namely, in a flash memory wherein a page can be programmed only once, the data can be written only once, and the data has to be erased first before the page is programmed again.

In step S603 of portion (b) as illustrated in FIG. 6, whether there is a plurality of physical blocks having unidentified update relationship in a logical-physical mapping table is determined after a power failure. If it is determined that there are such physical blocks in the logical-physical mapping table in step S603, an update relationship indicator is read from a redundant area in a page of each of the physical blocks in step S605. After that, in step S607, a block having the oldest (or newest) data is determined according to a plurality of circular words in the data update information read from the update relationship indicator. The number of these circular words may be between 3 and 5. The method for determining the block having the oldest (or newest) data has been described above therefore will not be described herein. Next, in step S609, the update relationship of the other physical blocks is further identified according to the circular words of the data update information.

The data protection method provided by the present invention is suitable for a non-volatile memory. Thus, the data protection method can be applied in various devices which use non-volatile memories as their storage media, such as the USB flash drive 702, the SD card 704a, MMC card 704b, CF card 704c, and memory stick 704d used by the digital camera (video camera) 704, and a SSD 706 etc.

In overview, in the data protection method provided by the present invention, the update relationship of a plurality of physical blocks mapped to the same logic block can be re-established after a power failure. Thereby, data loss caused by the power failure can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data protection method, suitable for a plurality of physical blocks mapped to a logical block in a non-volatile memory, wherein the physical blocks includes a block belonging to a data area, a block belonging to a substitution area and a block belonging to a temporary area, the data protection method comprising:

recording a data update information in the physical blocks, wherein the data update information is used for identifying an update relationship of the physical blocks, wherein the physical blocks having a temporary relationship;

determining whether the update relationship of the physical blocks is unidentified in a logical-physical mapping table after a power failure; and re-establishing the update relationship of the physical blocks according to the data update information if the update relationship of the physical blocks is unidentified in the logical-physical mapping table after the power failure, wherein the data update information comprises a plurality of words having a circular relationship, one of the words is recorded in each of the physical blocks and the number of the words is the number of the physical blocks mapped to the logical block plus one, the number of the words recorded in the physical blocks is equal to the number of the physical blocks, and the step of re-establishing the update relationship of the physical blocks according to the data update information includes re-establishing the update relationship of the physical blocks according to at least one unused word among the words, wherein the data update information is sequentially recorded in each of the physical blocks according to the update relationship and the circular relationship.

2. The data protection method according to claim 1, wherein the words are a plurality of numbers or a plurality of characters.

3. The data protection method according to claim 1, wherein the step of re-establishing the update relationship comprises identifying a physical block containing the data update information of a word next to the unused words as the physical block having the oldest data according to the circular relationship and sequentially identifying the update relationship of the other physical blocks according to the circular relationship.

4. The data protection method according to claim 1, wherein the step of re-establishing the update relationship comprises identifying a physical block containing the data update information of a word next to the unused words as the physical block having the newest data according to the circular relationship and sequentially identifying the update relationship of the other physical blocks according to the circular relationship.

5. The data protection method according to claim 1, wherein the step of recording the data update information in each of the physical blocks is to record the data update information in a redundant area of the physical block.

6. The data protection method according to claim 1, wherein the non-volatile memory is a flash memory wherein each page can be programmed only once.

7. A controller, suitable for a storage device, wherein a logical block in a non-volatile memory of the storage device is mapped to a plurality of physical blocks, and the physical blocks includes a block belonging to a data area, a block belonging to a substitution area and a block belonging to a temporary area, the controller comprising:

a non-volatile memory interface, for accessing the non-volatile memory;

a buffer memory, for storing data temporarily;

a microprocessor unit, for controlling the operation of the controller; and a memory management module, for managing the non-volatile memory, wherein the memory management module records a data update information in the physical blocks, and determines whether an update relationship of the physical blocks is unidentified in a logical-physical mapping table after a power failure of the storage device, wherein the physical blocks having a temporary relationship, wherein the memory management module re-establishes the update relationship of the physical blocks according to the data update information if the update relationship of the physical blocks is unidentified in the logical-physical mapping table after the power failure of the storage device, and wherein the data update information is used for identifying the update relationship of the physical blocks, the data update information comprises a plurality of words having a circular relationship, one of the words is recorded in each of the physical blocks and the number of the words is the number of the physical blocks mapped to the logical block plus one, and wherein the data update information is sequentially recorded in each of the physical blocks according to the update relationship and the circular relationship, wherein the number of the words recorded in the physical blocks is equal to the number of the physical blocks, wherein the memory management module re-establishes the update relationship of the physical blocks according to at least one unused word among the words.

8. The controller according to claim 7, wherein the words are a plurality of numbers or a plurality of characters.

9. The controller according to claim 7, wherein in re-establishing the update relationship the memory management module identifies a physical block containing the data update information of a word next to the unused words as the physical block having the oldest data according to the circular relationship and sequentially identifies the update relationship of the other physical blocks according to the circular relationship.

10. The controller according to claim 7, wherein in re-establishing the update relationship the memory management module identifies a physical block containing the data update information of a word next to the unused words as the physical block having the newest data according to the circular relationship and sequentially identifies the update relationship of the other physical blocks according to the circular relationship.

11. The controller according to claim 7, wherein in recording the data update information in each of the physical blocks the memory management module records the data update information in a redundant area of the physical block.

12. The controller according to claim 7, wherein the non-volatile memory is a flash memory wherein each page can be programmed only once.

13. The controller according to claim 12, wherein the flash memory is a single level cell (SLC) NAND flash memory or a multiple-level cell (MLC) NAND flash memory.

14. The controller according to claim 7, wherein the storage device is a flash memory storage medium, a universal serial bus (USB) flash drive, a flash memory card, or a solid state drive (SSD).

15. A data protection method, suitable for a plurality of physical blocks mapped to a logical block in a non-volatile memory, wherein the physical blocks includes a block belonging to a data area, a block belonging to a substitution area and a block belonging to a temporary area, the data protection method comprising:

recording a data update information in the physical blocks, wherein the data update information is used for identifying an update relationship of the physical blocks, wherein the physical blocks having a temporary relationship;

determining whether the update relationship of the physical blocks is unidentified in a logical-physical mapping table after a power failure; and re-establishing the update relationship of the physical blocks according to the data update information if the update relationship of the physical blocks is unidentified in the logical-physical mapping table after the power failure, wherein the data update information is recorded into each of the physical blocks while writing data into the physical block, wherein the data update information comprises a plurality of words having a circular relationship, one of the words is recorded in each of the physical blocks and the number of the words is the number of the physical blocks mapped to the logical block plus one, the number of the words recorded in the physical blocks is equal to the number of the physical blocks, and the step of re-establishing the update relationship of the physical blocks according to the data update information includes re-establishing the update relationship of the physical blocks according to at least one unused word among the words.

16. The data protection method according to claim 15, wherein the data update information can be recorded into the physical blocks only once.

17. The data protection method according to claim 15, wherein the number of the circular words is between 3 and 5.

18. A controller, suitable for a storage device, wherein a logical block in a non-volatile memory of the storage device is mapped to a plurality of physical blocks, and the physical blocks includes a block belonging to a data area, a block belonging to a substitution area and a block belonging to a temporary area, the controller comprising:

a non-volatile memory interface, for accessing the non-volatile memory;

a buffer memory, for storing data temporarily;

a microprocessor unit, for controlling the operation of the controller; and a memory management module, for managing the non-volatile memory, wherein the memory management module records a data update information in the physical blocks, and determines whether an update relationship of the physical blocks is unidentified in a logical-physical mapping table after a power failure of the storage device, wherein the physical blocks having a temporary relationship, wherein the memory management module re-establishes the update relationship of the physical blocks according to the data update information if the update relationship of the physical blocks is unidentified in the logical-physical mapping table after the power failure of the storage device, wherein the data update information is used for identifying the update relationship of the physical blocks, the data update information is recorded into the physical blocks while writing data into the physical block, and the data update information can be recorded into the physical blocks only once, wherein the data update information comprises a plurality of words having a circular relationship, one of the words is recorded in each of the physical blocks and the number of the words is the number of the physical blocks mapped to the logical block plus one, wherein the number of the words recorded in the physical blocks is equal to the number of the physical blocks, wherein the memory management module re-establishes the update relationship of the physical blocks according to at least one unused word among the words.

19. The controller according to claim 18, wherein the storage device is a flash memory storage medium, a universal serial bus (USB) flash drive, a flash memory card, or a solid state drive (SSD).

* * * * *